United States Patent
Nagayama (10) Patent No.: US 10,925,301 B2
(45) Date of Patent: Feb. 23, 2021

(54) PROCESS FOR PRODUCING INSTANT NOODLES

(75) Inventor: Yoshiaki Nagayama, Maebashi (JP)

(73) Assignee: SANYO FOODS CO., LTD., Tokyo (JP)

( * ) Notice: Subject to any disclaimer, the term of this patent is extended or adjusted under 35 U.S.C. 154(b) by 320 days.

(21) Appl. No.: 13/990,699

(22) PCT Filed: Apr. 18, 2011

(86) PCT No.: PCT/JP2011/059993
§ 371 (c)(1),
(2), (4) Date: May 30, 2013

(87) PCT Pub. No.: WO2012/111177
PCT Pub. Date: Aug. 23, 2012

(65) Prior Publication Data
US 2013/0251876 A1    Sep. 26, 2013

(30) Foreign Application Priority Data
Feb. 18, 2011    (JP) ............... JP2011-033625

(51) Int. Cl.
*A23L 5/10*    (2016.01)
*A23L 7/113*    (2016.01)
*A21C 11/24*    (2006.01)

(52) U.S. Cl.
CPC ............... *A23L 5/13* (2016.08); *A21C 11/24* (2013.01); *A23L 7/113* (2016.08)

(58) Field of Classification Search
USPC ................... 426/557, 502, 503, 518
See application file for complete search history.

(56) References Cited

U.S. PATENT DOCUMENTS 3,695,388 A * 10/1972 Paxhia ............... F02K 1/40
                                                181/206
4,098,906 A    7/1978 Hisaki et al.
4,243,689 A    1/1981 Kokeguchi et al.
(Continued)

FOREIGN PATENT DOCUMENTS

CA    1131985    9/1982
CN    101836710    9/2010
(Continued)

OTHER PUBLICATIONS

Jp 10210924, Ikeda et al Nov. 8, 1998, machine translation.*
(Continued)

*Primary Examiner* — Lien T Tran
(74) *Attorney, Agent, or Firm* — Merchant & Gould P.C.

(57) ABSTRACT

A process for producing noodle strips in which a dough sheet is slit into noodle strips using a rotary slitting device comprising at least a pair of cutting blade rolls, scraping members and air flow supply means. The dough sheet is passed through the cutting blade rolls, to thereby slit the dough sheet into noodle strips; the noodle strips are peeled off from the cutting blade rolls using the scraping members, to thereby separate into upper and lower noodle strip bundles; and air flow is supplied to the slit noodle strips from the air flow supply means. There is provided a process capable of stably realizing generally straight noodle strips with no strong longitudinal waves even in a mass production line.

8 Claims, 6 Drawing Sheets (56) References Cited

U.S. PATENT DOCUMENTS

| | | | | |
|---|---|---|---|---|
| 4,483,879 A * | 11/1984 | Sugisawa | ................ | A23L 7/109 |
| | | | | 426/451 |
| 5,417,989 A * | 5/1995 | Atwood | ............... | A21C 11/006 |
| | | | | 426/27 |
| 5,425,959 A | 6/1995 | Manser | | |
| 5,558,894 A * | 9/1996 | Henson | ................... | A21C 9/066 |
| | | | | 425/237 |
| 6,174,556 B1 * | 1/2001 | Bornhorst et al. | ............ | 426/503 |
| 6,419,973 B1 * | 7/2002 | Mattson | ................ | A23L 1/1645 |
| | | | | 426/516 |
| 6,644,174 B2 | 11/2003 | Sakurazawa | | |
| 7,789,644 B2 * | 9/2010 | Mihalos et al. | ............. | 425/104 |
| 2005/0244560 A1* | 11/2005 | Schultz | ................... | A21C 5/00 |
| | | | | 426/496 |
| 2011/0086153 A1 | 4/2011 | Yoshida et al. | | |

FOREIGN PATENT DOCUMENTS

| | | |
|---|---|---|
| EP | 0 758 530 | 2/1997 |
| EP | 2 308 311 | 4/2011 |
| JP | 59-002669 | 1/1984 |
| JP | 59-059162 | 4/1984 |
| JP | 9-51773 | 2/1997 |
| JP | 10-084896 | 4/1998 |
| JP | 10-210924 | 8/1998 |
| JP | 2000-189089 | 7/2000 |
| JP | 2005341897 A * | 12/2005 |
| JP | A-2005-341897 | 12/2005 |
| JP | A-2010-166848 | 8/2010 |
| JP | 2010-187623 | 9/2010 |
| KR | 10-0384827 | 5/2003 |
| KR | 10-2011-0013487 | 2/2011 |
| RU | 2 094 004 | 10/1997 |
| TW | 201031337 | 9/2010 |
| WO | WO 2010/095185 | 8/2010 |

OTHER PUBLICATIONS

Chinese Office Action for corresponding application No. 201180067517.7 dated Apr. 9, 2014 (8pages).
International Search Report for International Application No. PCT/JP2011/059993 dated Jul. 26, 2011.
Taiwanese Office Action for corresponding application No. 23765367 dated Feb. 27, 2014 (7 pages).
Korean Office Action for corresponding application No. 10-2013-7004194 dated Feb. 18, 2014 (3 pages).
Russian Office Action for corresponding application No. 2013113944/13 dated Mar. 13, 2014 (8 pages).
Office Action for European Patent Application No. 11858698.1 (dated Mar. 21, 2016).
Korean Notice of Allowance for corresponding application No. 10-2013-7004194 dated Sep. 23, 2014 (3pages).

* cited by examiner

(a) LINEAR SLIT (b) ROUND HOLE (c) SQUARE HOLE (d) SHORT SLIT (RECTANGULAR HOLE)

Fig.4

(a) UPPER SIDE (b) LOWER SIDE

Fig.5

(a) UPPER SIDE (b) LOWER SIDE

Fig.6

(a) UPPER SIDE (b) LOWER SIDE

PROCESS FOR PRODUCING INSTANT NOODLES

This application is a National Stage Application of PCT/JP2011/059993, filed 18 Apr. 2011, which claims benefit of Serial No. 2011-033625, filed 18 Feb. 2011 in Japan and which applications are incorporated herein by reference. To the extent appropriate, a claim of priority is made to each of the above disclosed applications.

TECHNICAL FIELD

The present invention relates to a process for producing "generally straight shaped" instant noodles whose "longitudinal wave" is suppressed as much as possible. More specifically, the present invention relates to a process for producing instant noodles whose waves are suppressed as much as possible in noodle strip at the time of eating, which is easily capable of obtaining instant noodles exhibiting satisfactory unfastening at the time of eating.

BACKGROUND ART

With respect to the recent consumers, they show a trend such that they prefer genuine or orthodox articles or goods in their daily life. For example, regarding instant Chinese noodles, consumers' demands, for not only handiness, but also more genuine or orthodox texture (and/or oral sensation) than before and more genuine or orthodox appearance than before have become severe. In order to meet the above various demands of the recent consumers, the respective companies are competing ruthlessly and performing technological innovation of instant noodles.

In the process of producing instant noodles, in general, fried noodles and non-fried noodles can be obtained by using wheat flour and various starches as a raw material therefor, and also using an alkaline brine solution (i.e. "Kansui") in the case of Chinese noodles or using polyphosphoric acid salts, etc., in the case of Japanese noodles, in place of the alkaline brine solution. In the production of noodles, an optional additive such as common or table salt, powdered egg, polysaccharide thickener, fat or oil, lecithin and the like can be added to the above raw material, and the resultant mixture is subjected to kneading and then formed into noodles by using a steam cooking step, and to a drying step, by using a predetermined drying method, to thereby obtain the fried dry noodles, and non-fried dry noodles. In non-fried noodles, drying processes such as hot-air drying, microwave drying, freeze-drying and cold-drying are used.

In case of producing instant noodles, in general, a "dough for noodles" obtained by kneading a raw material for noodles with kneading water may be rolled into a sheet, to thereby obtain a dough sheet, and then the dough sheet having a predetermined thickness is cut by a noodle cutting apparatus, to thereby obtain noodle strips. At this time, waves are formed in noodle strips for preventing noodle strips, which overlap each other as a result of gelatinization and elution of wheat flour as a main raw material and a starch added on a surface of noodle strips when noodle strips are pre-gelatinized in the subsequent steam cooking step, from sticking to each other.

The process of forming waves is as follows. That is, when the speed of a wave conveyer provided at the lower portion of a cutting blade device is lowered than that of noodle strips cut out from a cutting blade inside a conduit attached to the cutting blade device, noodle strings always slightly clog up and are bent inside the conduit. As a result, it is possible to form waves in a state where individual noodle strips are uniform. "Waves" of the noodle strips are generally waves in a running direction (i.e., longitudinal direction of noodle strips) of noodle strips cut by the cutting blade device (therefore, waves of the noodle strips may be sometimes referred to as "longitudinal waves", hereinafter).

In this way, it is possible to reduce the point of contact between individual noodle strips by forming waves on the noodle strips. Therefore, as mentioned above, it is possible to suppress sticking between adjacent noodle strips as much as possible even in the steam cooking step which is characteristic to the process for producing instant noodles. Thus, suppression of "sticking between adjacent noodle strips" as much as possible may cause a state where the steam-cooked noodle strips are likely to be unfastened and uniform drying can be carried out in the subsequent drying step, and thus making it possible to obtain noodle strips having satisfactory unfastening property at the time of eating.

However, such formation of waves may lead to so-called "waved noodles" in which noodle strips are waved at the time of eating, resulting in external appearance which is unsuited for waved noodles (for example, unnatural external appearance in udon, soba, pasta and the like).

With respect to the recent consumers, they show a trend such that they prefer genuine or orthodox articles or goods in their daily life. A demand for providing the above-mentioned various noodles with best suited external appearance, i.e., a demand for the establishment of the process for producing "straight noodles" instead of "waved noodles" has been increasing.

The process for producing instant noodles without forming waves in noodle strips includes Japanese Examined Patent Publication (JP-A; KOKAI) No. 2000-189089 (Patent Document 1). This process is the production process in which a boiling treatment is carried out without the steam cooking step. When slit noodle strips are boiled without steam cooking, waves formed in noodle strips by boiling are loosen even if waves are formed by a noodle cutting apparatus, and thus waves can be removed.

However, also in the boiling step similarly to the steam cooking step, elution of starch of noodle strips may cause a "state where noodle strips are likely to be stuck to each other". Therefore, only noodle strips with poor unfastening property can be usually obtained by a boiling operation alone.

As for JP-A No. 2000-189089, it is characterized in that common salt is dissolved in hot water for boiling and the concentration of the common salt is adjusted to 20% or more, to thereby prevent elution of a starch on a surface of noodle strips, and thus solving poor unfastening property. Surely, formation of waves is eliminated by boiling and also straight noodles with satisfactory unfastening property can be made by dissolving common salt in hot water for boiling and adjusting the concentration of the common salt to 20% or more. However, there was a drawback that a boiling tank must be newly arranged and investment of line facility increases and also noodles become salty at the time of easting since the concentration of the common salt is too high.

JP-A No. 2010-187623 (Patent Document 2) also discloses a noodle making slitting device characterized by largely changing the position where scraping is carried out by a cutting blade, and a process for producing noodles using the device. This process is the process which enables large shift of the position where noodle strips are torn off by largely changing the position where scraping is carried out by a cutting blade through each of an upper cutting blade roll and a lower portion cutting blade roll. According to this process, slit adjacent raw noodle strips do not undergo synchronization by changing the position where noodle strips are torn off even if strong waves are not imparted to noodle strips. As a result, it is possible to obtain noodle strips in which the point of contact between noodle strips is reduced and binding between slit noodle strips is suppressed. Surely, JP-A No. 2010-187623 can prevent synchronization (i.e., adjacent noodle strips perform the similar "movement") of adjacent noodle strips by changing the position where adjacent noodle strips are torn off. In a mass production line, in general, it may be necessary that noodle strips are separated into rows (i.e., "partition plate" for separating into rows is attached to a cutting blade device of noodle strips). This cutting blade device of JP-A No. 2010-187623 has a problem that it is difficult to perform the above-mentioned "separation into rows" as compared with a conventional device because of the complicated position where a scraping member of the cutting blade device is arranged.

As mentioned above, there has never been proposed, as practical process, a process for producing noodle strips, capable of producing "generally straight noodles" in which the demand of the recent consumers for the "genuine or orthodox articles or goods" has been increasing more stably (i.e., with higher certainty) in place of conventional "waved noodles" (i.e., noodles with strong longitudinal waves).

PRIOR ART DOCUMENTS

Patent Documents

Patent Document 1: JP-A No. 2000-189089
Patent Document 2: JP-A No. 2010-187623

DISCLOSURE OF THE INVENTION

Problems to be Solved by the Invention

An object of the present invention is to provide a process capable of stably producing "generally straight" noodle strips which also has satisfactory "unfastening property" at the time of eating.

Another object of the present invention is to provide a process capable of stably producing "generally straight" noodle strips even in a mass production line.

Means for Solving the Problems

As a result of earnest study, the present inventors have found that it is extremely effective for the achievement of the above objects to supply air flow to a noodle strip bundle, in a cutting blade device using upper and lower cutting blade rolls, from air flow supply means arranged between the respective upper and lower noodle strip bundles slit by the upper and lower cutting blade rolls (usually peeled off by a "scraping member" arranged in the vicinity of the upper and lower cutting blade rolls).

The process for producing instant dried noodles of the present invention has been made based on the above-mentioned discovery and is more specifically a process for producing noodle strips in which a dough sheet is slit into noodle strips using a rotary slitting device including at least a pair of cutting blade rolls, a scraping member and air flow supply means, the process including at least the steps of:

passing the dough sheet through the cutting blade roll, to thereby slit the dough sheet into noodle strips;

peeling the noodle strips off from the cutting blade roll using the scraping member, to thereby separate into upper and lower noodle strip bundles; and supplying air flow to the slit noodle strips from the air flow supply means.

According to the present invention with the above constitution, it becomes possible to impart random directionality to individual noodle strips by air flow supplied from air flow supply means in the respective upper and lower noodle strip bundles slit out by a cutting blade device. As a result, according to the present invention, it is possible to obtain generally linear noodle strips with "satisfactory unfastening property" while suppressing the generation of longitudinal waves as much as possible in noodle strips. The present invention enables the achievement of "satisfactory unfastening property" of noodle strips by such "imparting non-uniformity in a running direction". It may be generally difficult to realize such random directionality of noodle strips in an aspect in which air flow is not utilized, like the present invention.

As mentioned above, in the prior art, it was most important 37 how noodle strips with strong longitudinal waves (i.e., "rugged" noodle strips) are stably obtained (in other words, how strong longitudinal waves are stably imparted to noodle strips), from the viewpoint of regarding "unfastening property" at the time of eating. Therefore, it might be generally recognized that it is out of the question to apply an "external force" (for example, wind), which may rumple "stable longitudinal waves", to noodle strips. That is, in the prior art, it was intended to achieve "satisfactory unfastening" of noodle strips by imparting "stable longitudinal waves" to noodle strips.

The present invention can include, for example, the following embodiments:

[1]

A process for producing noodle strips in which a dough sheet is slit into noodle strips using a rotary slitting device comprising at least a pair of cutting blade rolls, scraping members and air flow supply means, the process comprising at least the steps of:

passing the dough sheet through the cutting blade roll, to thereby slit the dough sheet into noodle strips;

peeling the noodle strips off from the cutting blade rolls using the scraping members, to thereby separate into upper and lower noodle strip bundles; and supplying air flow to the slit noodle strips from the air flow supply means.

[2]

The process for producing noodle strips according to [1], wherein the air flow is air flow which acts in a direction of pushing out the noodle strips toward a running direction of the noodle strips.

The process for producing noodle strips according to [1] or [2], wherein the air flow supply means supplies the air flow between the lower noodle strips and the upper noodle strips.

[4]

The process for producing noodle strips according to any one of [1] to [3], wherein the air flow, which is supplied to the noodle strips from the air flow supply means, is flow with directionality.

[5]

The process for producing noodle strips according to any one of [1] to [4], wherein the air flow supply means includes a hollow columnar or hollow prismatic tubular member.

[6]

The process for producing noodle strips according to any one of [1] to [5], wherein the air flow supply means is provided with a plurality of air flow discharge ports.

[7]

The process for producing noodle strips according to [6], wherein the air flow discharge port has a polygonal slit, circular or oval shape.

[8]

The process for producing noodle strips according to any one of [1] to [7], wherein the air flow supply means is arranged between upper and lower cutting blade rolls, and air flow from the air flow supply means is supplied between the upper and lower noodle strip bundles peeled off by scraping members.

[9]

The process for producing noodle strips according to any one of [1] to [8], wherein the air flow supply means is arranged between a pair of cutting blade rolls, and also air flow is supplied to the position, where the air flow is directly supplied to each of the upper and lower noodle strip bundles, from the air flow supply means.

[10]

A process for producing noodle strips in which a dough sheet is slit into noodle strips using a rotary slitting device comprising at least a pair of cutting blade rolls, scraping members and air flow supply means, the process comprising at least the steps of:

passing the dough sheet through the cutting blade rolls, to thereby slit the dough sheet into noodle strips;

peeling the noodle strips off from the cutting blade rolls using the scraping member, to thereby separate into upper and lower noodle strip bundles;

supplying air flow to the slit noodle strips from the air flow supply means, to thereby form a generally flat noodle strip bundle without substantially forming a longitudinal waves in the noodle strips; and pre-gelatinizing the noodle strips, followed by drying.

[11]

The process for producing instant dried noodles according to [10], wherein the generally flat noodle strip bundle is formed by gathering the noodle strips moved irregularly.

[12]

The process for producing instant dried noodles according to [11], wherein generally irregular movement of the noodle strip bundle gives an annular, transverse wave-shaped and/or zigzag-shaped orbit.

[13]

The process for producing instant dried noodles according to any one of [10] to [12], wherein a steamer using steam is used as the pre-gelatinization means.

[14]

Noodle strips for instant dried noodles produced by slitting a dough sheet into noodle strips using a rotary slitting device comprising at least a pair of cutting blade rolls, scraping members and air flow supply means, wherein the slit noodle strips has "sticking degree" of 35% or less.

Effects of the Invention

As mentioned above, according to the present invention, it becomes possible to produce noodle strips in which random directionality is imparted to individual noodle strips by air flow supplied from air flow supply means in the upper and lower noodle strip bundles slit from a cutting blade device. As a result, according to the present invention, it becomes possible to stably produce generally linear noodle strips with "satisfactory unfastening property" while suppressing the generation of longitudinal waves in noodle strips.

According to the present invention, it is also possible to obtain generally linear noodle strips with "satisfactory unfastening property" at the time of eating even if strong longitudinal waves are not imparted.

MODE FOR CARRYING OUT THE INVENTION

The present invention will be more specifically described below with reference to the accompanying drawings, as desired. In the following description, "part(s)" and "%" representing a quantitative ratio, are based on mass, unless otherwise noted specifically.

(Process for Production of Noodle Strips)

The present invention relates to a process for producing noodle strips in which a dough sheet is slit into noodle strips using a rotary slitting device comprising at least a pair of cutting blade rolls, scraping members and air flow supply means, the process comprising at least the steps of: passing the dough sheet through the cutting blade roll, to thereby slit the dough sheet into noodle strips; peeling the noodle strips off from the cutting blade rolls using the scraping members, to thereby separate into upper and lower noodle strip bundles; and supplying air flow to the slit noodle strips from the air flow supply means.

(Noodle Strips)

The noodle strips of the present invention are noodle strips produced by slitting a dough sheet into noodle strips using a rotary slitting device including at least a pair of cutting blade rolls, scraping members and air flow supply means. The noodle strips of the present invention are characterized in that the slit noodle strips have "sticking degree" of 35% or less. This "sticking degree" can preferably be measured by the below-mentioned process. The "sticking degree" may more preferably be 25% or less, and still more preferably 20% or less (especially, 15% or less).

(Cutting Blade Device)

Figure 1:
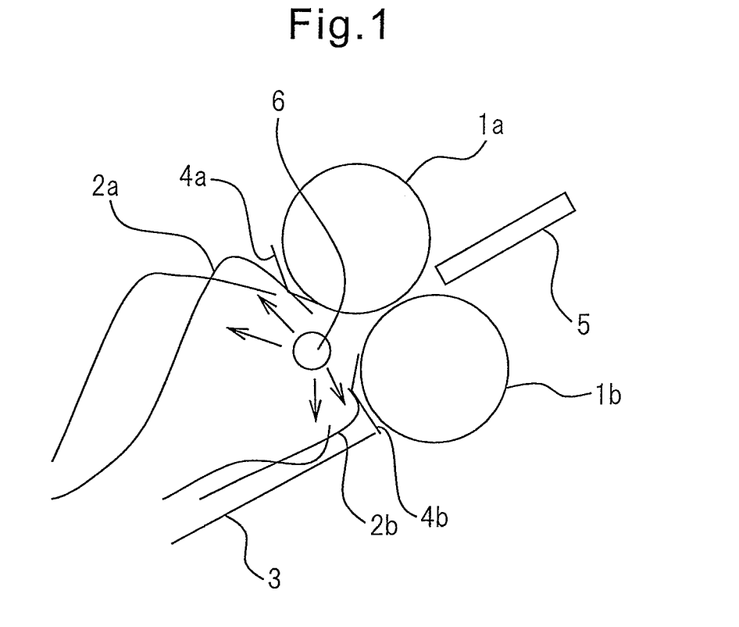
FIG. 1 is a schematic sectional view showing the constitution of an aspect of a cutting blade device which is preferably usable in the present invention.
Figure 2:
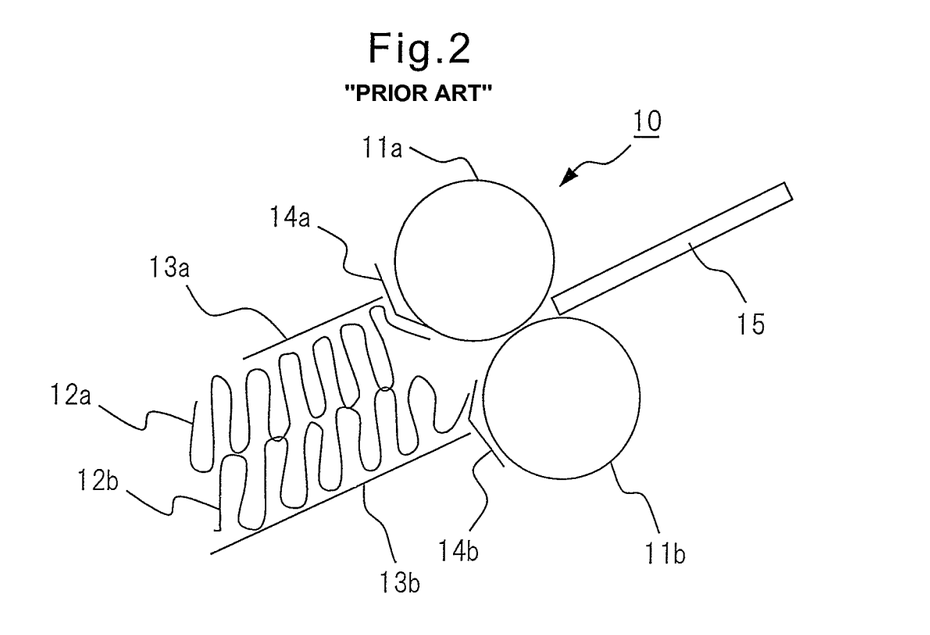
FIG. 2 is a schematic sectional view showing the constitution of a conventional cutting blade device.

FIG. 1 is a schematic sectional view showing an embodiment of a cutting blade device which is preferably usable in a process for producing noodle strips of the present invention. FIG. 2 is a schematic sectional view showing an embodiment of a cutting blade device which is preferably usable in a process for producing conventional noodle strips.

(Conventional Cutting Blade Device)

First, the case where a conventional cutting blade device is used will be described. Referring to FIG. 2, this cutting blade device 10 includes a pair of cutting blade rolls 11a and 11b for slitting a dough sheet into noodle strips, arranged opposite to each other via a predetermined clearance; a press plate 13a and a shoot 13b, for guiding each of noodle strips 12a and 12b slit in a noodle strip state by the cutting blade roll; and blade-shaped "scraping" members 14a and 14b for "peeling" each of noodle strips 12a and 12b off from cutting blade rolls 11a and 11b. In this example of FIG. 2, the above-mentioned press plate 13a and shoot 13b constitute a "conduit" for guiding the slit noodle strips. In FIG. 2, a "wave conveyer" (not shown) for transporting the slit noodle strips 12a and 12b toward the left side of the drawing is arranged at the downward of the shoot 13b.

Referring to FIG. 2, in a process for producing a conventional noodle strips, a dough sheet 15 is slit into upper and lower noodle strips 12a and 12b by a pair of cutting blade rolls 11a and 11b, and transported toward the left side of the drawing by the wave conveyer while being guided by a "conduit" (i.e., guide member) composed of a press plate 13a and a shoot 13b.

When the conventional cutting blade device shown in FIG. 2 is used, in case of the production of instant noodles, regarding noodle strips slit by cutting blade rolls 11a and 11b, noodle strips 12a and 12b are forcibly bent in the conduit by a difference between a speed of noodle strips guided by the conduit and slit and a speed of the wave conveyer, together with resistance of a shoot plate 13b of the conduit and a press plate 13a of the conduit in the conduit, to thereby form waves. At this time, the size of waves depends on the height of the space between the shoot plate 13b and the press plate 13a of the conduit. Furthermore, since the shoot plate 13b and the press plate 13a of the conduit are usually made of metal, noodle strips 12a and 12b are strongly bent in the degree of bending of waves, and thus waves of these "strong" noodle strips 12a and 12b are fixed in the subsequent steam cooking step.

As mentioned above, when the conventional cutting blade device is used, the press plate 13a (i.e., cover) of the conventional cutting blade device is made of metal (stainless steel, etc.), and thus two upper and lower waves become waves with a uniform size. These waves are rather excellent for the purpose of "uniform waves".

(Cutting Blade Device of the Present Invention)

Referring to FIG. 1, in an embodiment of the present invention, a cutting blade device 1 used in the present invention includes a pair of cutting blade rolls 1a and 1b for slitting a dough sheet into noodle strips, arranged opposite to each other via a predetermined clearance; a shoot 3 for guiding each of noodle strips 2a and 2b slit in a state of noodle strips by the cutting blade roll; and blade-shaped "scraping" members 4a and 4b for "peeling" each of noodle strips 2a and 2b off from cutting blade rolls 1a and 1b. In FIG. 1, a "wave conveyer" (not shown) for transporting the slit noodle strips 2a and 2b toward the left side of the drawing is arranged at the downstream of the shoot 3.

Referring to FIG. 1, in this embodiment, a dough sheet 5 is slit into upper and lower noodle strips 2a and 2b by a pair of cutting blade rolls 1a and 1b, "peeled off" from cutting blade rolls 1a and 1b by the action of blade-shaped "scraping" members 4a and 4b, and then transported toward the left side of the drawing by the wave conveyer while being guided by a guide member composed of a shoot 3.

The cutting blade device used in the present invention is characterized by being provided with air flow supply means 6 for supplying air flow to the slit noodle strips 2a and 2b.

As mentioned above, the cutting blade device 1 used in the present invention is obtained by modifying the cutting blade device used to produce the above-mentioned conventional instant noodles. More specifically, this cutting blade device 1 has a structure in which air flow is directly supplied to noodle strips 2a and 2b slit by cutting blade rolls 1a and 1b and peeled off by scraping members 4a and 4b by providing air flow supply means 6 (i.e., air flow piping provided with air flow discharge (or exhaust) port, etc.) between upper and lower scraping members 4a and 4b arranged in the cutting blade devise 1.

In the present invention, it is possible to impart random directionality (force) to individual noodle strips by allowing the air flow supply port of this air flow piping 6 to have hole shape and hole diameter which can impart "directionality" to air flow. Whereby, it is possible to suppress the point of contact between the respective noodle strips as much as possible without imparting "longitudinal waves", which was important in the prior art, to noodle strips, and thus making it possible to suppress sticking between noodle strips even in the pre-gelatinization step after the slitting step. As a result, it is possible to easily obtain generally linear noodle strips.

<Detailed Mechanism of Cutting Blade Device>

The mechanism of a cutting blade device used in the present invention will be described. A schematic view of a conventional cutting blade is shown in FIG. 2. A schematic view of a cutting blade used in the present invention is shown in FIG. 1.

Referring to FIG. 2, when the conventional cutting blade device is used, noodle strips slit from a dough sheet 15 are separated into two upper and lower layers (i.e., noodle strips 12a and 12b) inside conduits (13a and 13b) to form strong longitudinal waves.

In contrast, in the cutting blade device (FIG. 1) used the present invention, since a cover (13a of FIG. 2) of a conduit arranged in the conventional cutting blade device is removed, it is possible to blow air with directionality flow to noodle strip bundles 12a and 12b of two upper and lower layers by arranging air flow supply means 6 between upper and lower scraping members 4a and 4b.

Figure 3:
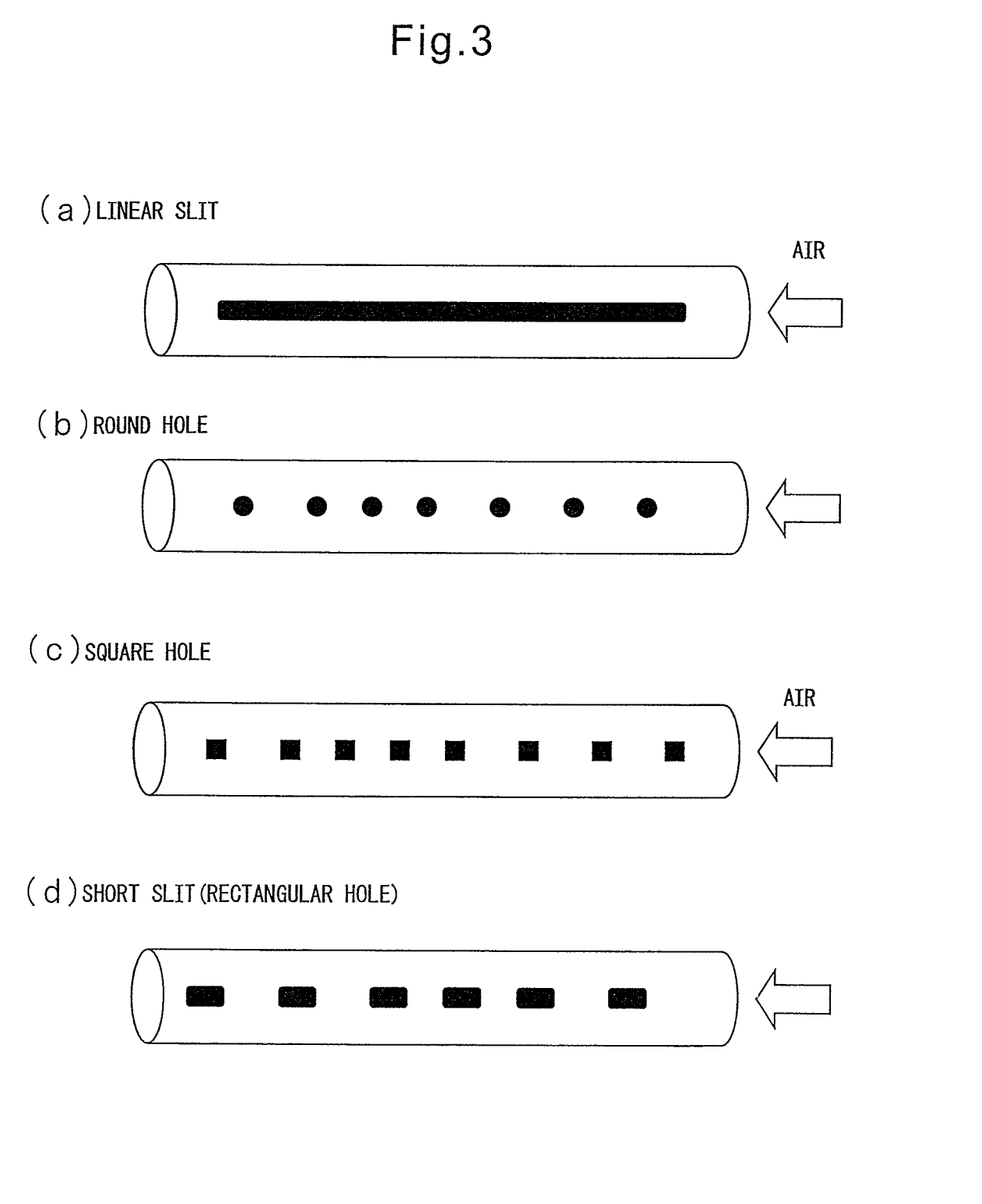
FIG. 3 is a schematic perspective view showing an example of the shape of air flow supply port which is preferably usable in the present invention.

Furthermore, in this embodiment, the air flow supply means 6 is provided, for example, with a plurality of round holes as shown in a schematic perspective view of FIG. 3(b), and air flow is discharged through a plurality of round holes and air flow is supplied to noodle strips 2a and 2b.

Formation of longitudinal waves (i.e., waves in a longitudinal direction of noodle strips), which are forcibly bent in a conduit, may be suppressed by using the cutting blade device with the above constitution of FIG. 1. More specifically, the longitudinal waves are not entirely formed, or only suppressed longitudinal waves are formed. As a result, the upper noodle strip 2a and the lower noodle strip 2b respectively become flat ring-shaped, curved, zigzag-shaped irregular noodle strips, and thus the point of contact between individual noodle strips can be reduced, as similar to the case where longitudinal waves are formed. In addition, according to the present invention, it is also possible to directly blow air flow to noodle strips 2a and 2b peeled off by a scraper in air. Therefore, it is possible to allow these noodle strips to jump comparatively easily, to thereby create random directionality to individual noodle strips 2a and 2b. Herein, it is possible to obtain comparatively large flat ring-shaped, curved, zigzag-shaped noodle strips 2a and 2b by removing the cover of the conduit. It is also possible to provide a baffle plate (not shown) for preventing noodle strips from jumping out at the upper side of a scraper 4a for the purpose of preventing excess blowing up of noodle strips 2a and 2b.

In the present invention, it is also possible to momentarily dry a surface of noodle strips 2a and 2b by supplying air blow to noodle strips 2a and 2b slit by cutting blade rolls 1a and 1b in air immediately after being peeled off by scraping members 4a and 4b. Therefore, it is also possible to comparatively harden a surface of noodle strips 2a and 2b. Whereby, it is possible to convert a bundle of the entire noodle strips 2a and 2b into a "comparatively loose" state on a wave conveyer, together with random resistance to be applied to noodle strips based on the above-mentioned supply of air flow. It is also possible to surely separate the upper and lower noodle strips 2a and 2b, to thereby impart random directionality. Therefore, an interaction between the upper and lower noodle strip bundles is suppressed, and thus a noodle strip bundles with no strong longitudinal waves (i.e., generally linear) can be obtained on the wave conveyer in a state where upper and lower noodle strip bundles are surely separated.

In the present invention, although the above-mentioned shoot member 3 is used in the embodiment shown in FIG. 1, this shoot member 3 can be omitted. When the shoot member 3 is used, the noodle strip 2b peeled off by the lower scraping member 4b may be sometimes pressed against the shoot member 3 through air flow supplied from air flow supply means 6. When such "pressing" is generated, the lower noodle strip 2b hits the shoot member 3 and thus noodle strip 2b, which initiate irregular movement by chance of the movement, may cause synchronization again. In order to prevent revival of "synchronization" of these noodle strips, for example, a force of air flow from the air flow supply means 6 may be controlled. In order to prevent revival of "synchronization" of these noodle strips, it is also possible to arrange the shoot member 3 downward so that an angle of the shoot member 3 becomes nearly vertically downward in order to prevent the noodle strip 2b from hitting the shoot member 3, or to remove the shoot member 3 per se from the cutting blade device 1.

(Orbit Drawn by Noodle Strip at the Time of Supply of Air Flow)

Figure 7:
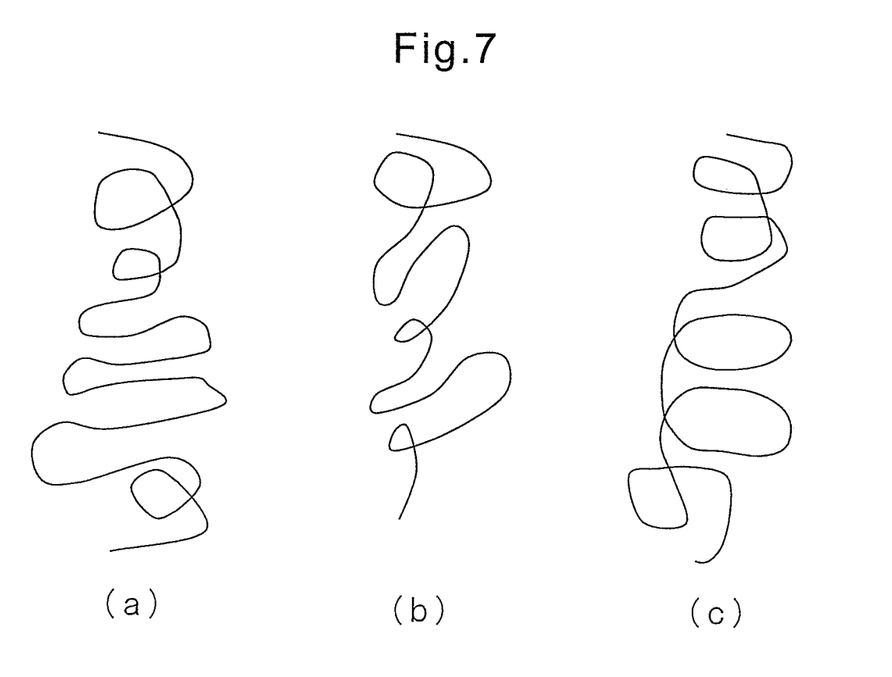
FIG. 7 is a schematic plan view showing an example of a noodle strip orbit on a wave conveyer obtained by the present invention.

An example of an orbit of a noodle strip of the present invention is shown in FIG. 7 (a schematic plan view of a noodle strip orbit which can be obtained on a wave conveyer). Regarding the orbit of the noodle strip, an orbit drawn by the individual noodle strip becomes irregular by applying a random force to each noodle strip using air flow. As a result, the individual noodle strip irregularly draws a flat ring-shape or a curve, continuously. FIG. 7(a) shows an orbit in which a flat ring-shape and a curve coexist, FIG. 7(b) shows an orbit in which flat curve shifts in the direction opposite to the a running direction, and FIG. 7(c) shows an orbit in which counterclockwise and clockwise flat ring-shapes coexist irregularly. In the present invention, the orbit drawn by each noodle strip usually becomes an unpredictable random state, as shown in FIG. 7, by blowing air flow to the noodle strip.

It is very difficult to obtain the orbit of the noodle strip in the state of FIG. 7(c) only by changing the position where the noodle strip is peeled off, as shown in JP-A No. 2010-187623. Since it is impossible to impart random movement to the individual noodle strip in the technology of the publication, it is difficult to draw irregular rings such as counterclockwise and clockwise rings, and each noodle strip basically draws a clockwise or counterclockwise ring in the same direction. In contrast, in the present invention, it is possible to reduce the point of contact between noodle strips in the entire noodle strips by obtaining each of the noodle strips in a state as shown in FIG. 7.

Japanese Patent No. 4,381,470 discloses a production process in which one noodle strip repeatedly draws a ring and the noodle strip does not synchronize with adjacent noodle strip, and entire noodle strips create a noodle strip bundle and generally linear noodle strips can be obtained by stretching noodle strips after the steaming step when the noodle strip bundle is steamed in a state where noodle strips overlap each other. In contrast, in the present invention, one noodle strip may perform irregular movement, for example, the noodle strip draws a ring or a curve, or becomes a zigzag state by blowing air flow to the noodle strips. Therefore, according to the process of the present invention, it is virtually impossible to repeatedly draw rings (i.e., the phenomenon or effect obtained by the present invention is completely different). Furthermore, according to the present invention, it is also possible to obtain the effect of momentarily dry a surface of the noodle strip by using air flow, and to obtain the effect in which the effect of suppressing sticking between noodle strips is further promoted.

Other Embodiments

Description was made mainly on the embodiment of the present invention shown in FIG. 1 in which air flow supply means 6 include a tubular (or piping) member. In such an embodiment, a plurality of round holes as shown in FIG. 3(b) are formed on a tubular member constituting the air flow supply means 6. Description will be made on embodiments other than the above-mentioned embodiment.

(Constitution of Air Flow Supply Means)

There is no particular limitation on the shape, structure, mechanism and the like of the air flow supply means in the present invention as long as the air flow supply means has the constitution (or structure) which enables supply of air flow to the slit noodle strip. For example, it is preferred that the air flow supply means 6 may have the constitution including a hollow tubular (cylindrical) member which enables comparatively simple structure, from the viewpoint of the space in case of arranging in the vicinity of cutting blade rolls 1a and 1b of FIG. 1 and the influence exerted on elements of other devices (for example, electric, magnetic influence).

In the present invention, the air flow supply means 6 is not limited to such the constitution including a hollow tubular member as long as air flow can be supplied to the slit noodle strips, as a matter of course. For example, the air flow supply means 6 may preferably be those in which a plurality of nozzles are used in combination (for example, a plurality of nozzles are bundled, or arranged in parallel, etc.). When the below-mentioned plural air flow discharge ports or plural nozzles are used, intervals between them to be arranged may be even intervals, and it may also be preferred that uneven intervals and/or even intervals are appropriately used in combination.

In the present invention, there is also no particular limitation on the gas constituting air flow from the air flow supply means 6. From the viewpoint of easiness of use (availability, cost), the gas may preferably be air per se. However, all or portion of the gas may be optionally substituted with the other gas (for example, nitrogen). According to demand of wetting (or drying) with respect to slit noodle strips, the above gas can also be appropriately mixed with steam.

(Arrangement Position of Air Flow Supply Means)

The arrangement position of air flow supply means 6, which is usable in the present invention, will be described with reference to FIG. 1.

The air flow supply means 6 used in the present invention may preferably has the size enough to be arranged between scraping members 4a and 4b of a cutting blade device 1 (FIG. 1). There is also no particular limitation on the shape of the air flow supply means 6, and the shape may be appropriately selected from known shapes such as ring, quadrangle, triangle, oval and plate, optionally.

In the present invention, the air flow supply means 6 may preferably be arranged in proximity to upper and lower cutting blade rolls 1a and 1b, and at a position corresponding to the space between the upper side and the lower side of a tip (i.e., a position at which peeling off of noodle strips 2a or 2b from a cutting blade roll 1a or 1b is initiated) of scraper 4a and 4b. In other words, it may be preferred that the air flow supply means 6 is arranged between an upper noodle strip bundle 2a and a lower noodle strip bundle 2b at the time when a dough sheet 5 is slit by cutting blade rolls 1a and 1b and peeled off by scraper 4a and 4b.

(Structure of Air Flow Supply Means)

In an embodiment of a structure in which the air flow supply means 6 includes a hollow tubular member (or piping), it may preferably be provided with a hole through which air flow is discharged from the hollow tubular member. The hollow tubular member for supplying air flow can be connected to a supply source of the air flow, for example, air flow compressor, air flow blower and the like. Taking a pressure or the like of air flow to be blown into consideration, a high-pressure air flow compressor may preferably be used.

A discharge port of air flow may be formed at the position which enables blowing to upper and lower noodle strip bundles 2a and 2b, and may preferably be a discharge port for creating air flow (i.e., gas with directionality). From the viewpoint of easily creating such air flow, it may be preferred to form a round hole, a square hole, a shot-slit shaped hole and the like shown in FIG. 3(*b*) to FIG. 3(*d*) at some intervals rather than a linear slit-shaped discharge port shown in FIG. 3(*a*). That is, the position where air flow is blown off and the position where air flow is not blown off are created by forming holes at some intervals, and also it becomes easy to create directionality of air flow by forming, as the hole, a round hole, a square hole and a short slit-shaped hole.

Regarding a blowing angle of air flow, air flow with directionality may be blown vertically or obliquely to the noodle strip bundle. However, it is necessary to pay attention to the fact that the noodle strip may be sometimes caught on the air flow supply means 6 when air flow is blown in the direction opposite to a running direction of the noodle strip bundle. For example, the presence of a noodle strip to which air flow is blown and a noodle strip to which air flow is not blown (or only weak air flow is blown) enables a change in orbit of each noodle strip in air. As a result, it becomes possible to change the orbit drawn on the wave conveyer in various forms.

In the present invention, it may be preferred to apply a "non-uniform force" to adjacent noodle strips using a plurality of "pores or slits" from the viewpoint of ease of blowing preferable air flow to the entire noodle strips. It is also possible to use a single "pore or slit". However, when air flow is simply supplied from the single "pore or slit", nearly uniform force is applied to adjacent noodles and thus it becomes slightly difficult to apply a "non-uniform force" to adjacent noodle strips.

Figure 4:
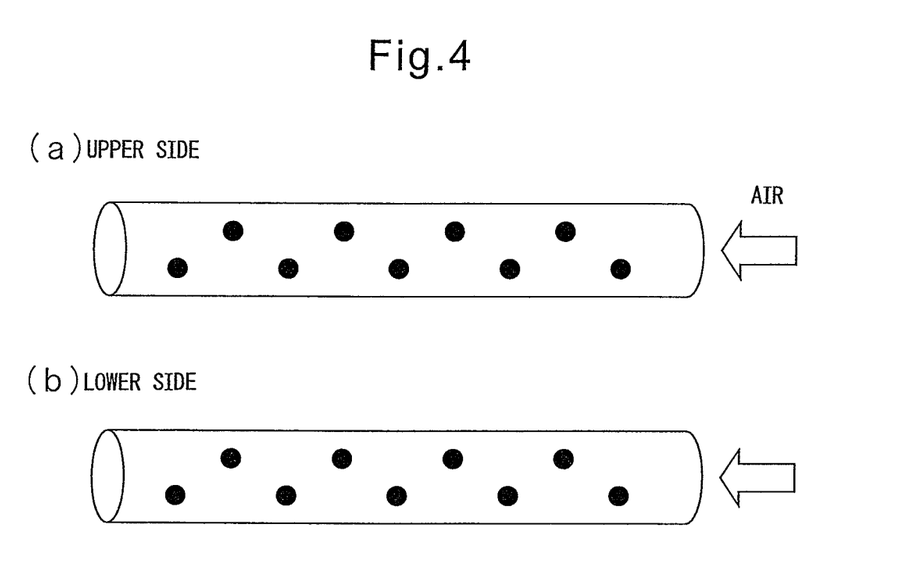
FIG. 4 is a schematic perspective view showing an example of the arrangement of air flow supply port (staggered type) which is preferably usable in the present invention.

In order to obtain the effects of the present invention, as shown in FIGS. 4(*a*) and 4(*b*), for example, it may be preferred that, regarding the shape of the air flow supply means 6, the air flow supply means 6 is formed of a hollow round bar and round holes are formed in the form of a staggered type. Whereby, a discharge angle and a discharge position of air flow shift, and thus air flow with directionality can be blown to the noodle strip.

In the present invention, when air flow discharge ports are formed in the form of a "staggered type" of FIG. 4(*a*) at the upper side of a hollow cylindrical member constituting the air flow supply means 6 and also air flow discharge ports are formed in the form of a "staggered type" of FIG. 4(*b*) at the lower side of the member, it becomes easy to blow air with directionality to each noodle strip. By using a hollow cylindrical member (round bar), an exhaust angle can vary. From the viewpoint of preventing the noodle strip from being caught on the air flow supply means 6, it may be preferred to use a round bar which is scarcely caught on the air flow supply means.

Figure 5:
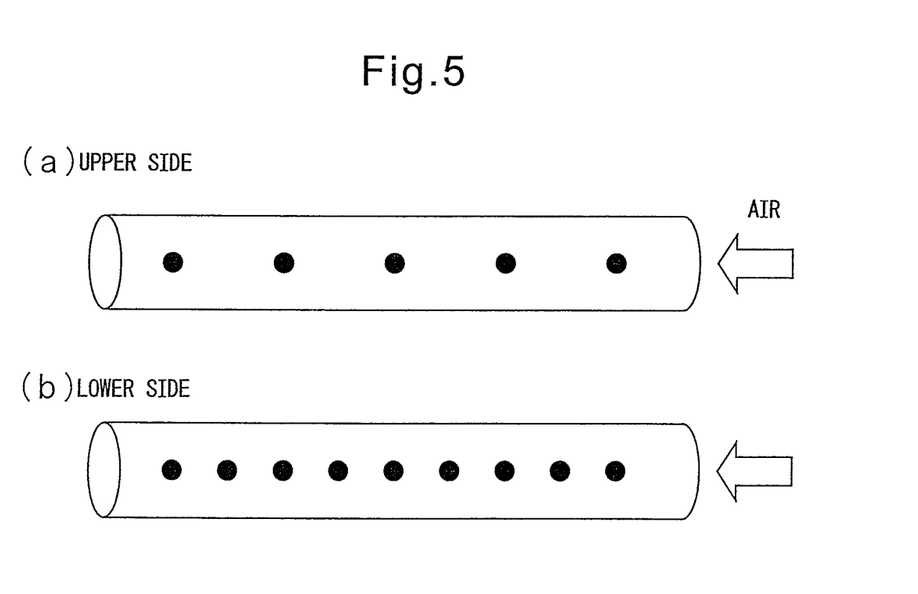
FIG. 5 is a schematic perspective view showing an example of the arrangement of air flow supply port (series type) which is preferably usable in the present invention.

In the present invention, it is also possible to form air flow discharge ports of FIG. 5(*a*) at the upper side of the above hollow cylindrical member and to form air flow discharge ports of FIG. 5(*b*) at the lower side of the member. In such way, there may be an embodiment in which lineally arranged air flow discharge ports are formed. In this case, as shown in FIG. 5, the position where air is blown to the noodle strip and the position where air is not blown to the noodle strip can be formed by changing the pitch of holes. As a result, it is possible to easily change the orbit of each noodle strips.

Figure 6:
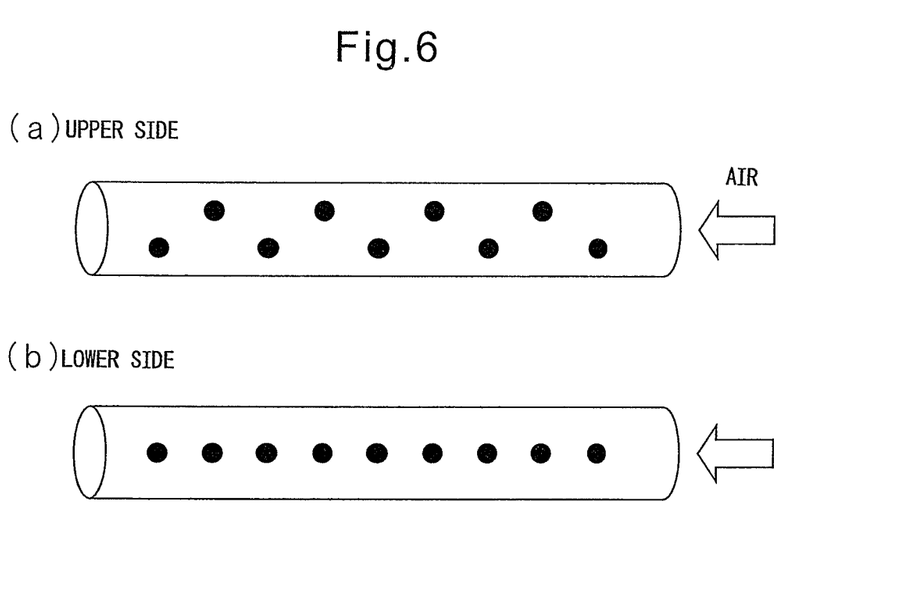
FIG. 6 is a schematic perspective view showing an example of the arrangement of air flow supply port (staggered/series mixed type) which is preferably usable in the present invention.

In the present invention, it is also possible to form "staggered type" air flow discharge ports of FIG. 6(*a*) at the upper side of the above hollow cylindrical member and to form "linear" air flow discharge ports of FIG. 6(*b*) at the lower side of the member. In this way, it is also effective to change the way to form air flow discharge port at the upper side and the lower side of the hollow cylindrical member. It is possible to apply a random force to each noodle strip.

In the present invention, from the viewpoint of making it easy to blow air with directionality flow to each noodle strip at random (it becomes irregular, for example, noodle to which air flow is blown, noodle to which air flow is not blown, the case where air flow is blown, the case where air flow is not blown), the orbit drawn by individual noodle strips can be irregularly changed. As a result, the noodle strip on the wave conveyer upsets as if it acts vigorously and the noodle strip can draw flat rings each having a different size, or can draw a flat curve in a running direction, a direction opposite to the running direction, a lateral direction to a running direction, and an oblique direction to the running direction without drawing a ring. In other words, it is possible to arrange each noodle strip at unpredictably random on the wave conveyer. As a result, it is possible to effectively reduce the points of contact between individual noodle strips (without imparting strong longitudinal waves to the noodle strip). This random movement can be obtained by air flow. Alternatively, noodle strips allowed to jump in air by air flow collide with each other and the orbit of the noodle strip is changed by impact at the time of collision, and thus unpredictable random movement can be further obtained.

Each step for producing noodle strips will be described below.

(Instant Noodles)

"Instant noodles" or "instant dried noodles" in the present invention may be any of so-called stewed type instant noodles and cooked type instant noodles which are cooked by pouring hot water.

<Step of Producing Dough for Noodles> (Material of Noodle)

In the present invention, the material of noodles may not be particularly limited. That is, it is possible to use materials, which have usually been used in the production of instant noodles, without any particular limitation. More specifically, for example, main raw materials and auxiliary raw materials described in "New Guide to Instant Noodle" (i.e., "Shin-Sokusekimen Nyuumon") supervised by Juridical Person, Convenience Foods Industry Association of Japan (i.e., Sokuseki Shokuhin Kogyo Kyokai), pp. 52-62 can be used in the present invention, without any particular limitation.

(Main Raw Material)

Specific examples of the main raw material which is usable in the present invention may include wheat flour, durum powder, soba powder, barley flour, starch and the like. Among these raw materials, specific examples of the main raw material, which can be preferably used, may include: wheat flour such as Australian standard (medium-hardness) White wheat (ASW, protein content about 10%), or American hard red wheat (HRW, protein content about 11%), or starchs such as potato starch, tapioca starch, waxy corn starch, corn starch, heat starch, etc. It is also possible to use those obtained from these raw materials, such as etherified starch, esterified starch, crosslinked starch and acid-modified starch.

(Auxiliary Raw Material)

Specific examples of the auxiliary raw material, which is usable in the present invention may include: alkaline brine solution, phosphate, salt, thickening polysaccharides, egg, gluten and the like.

(Process for Producing Noodles)

A process for producing noodles is as follows. Using wheat flour as a main raw material, starch, gluten and the like are optionally blended, and then the mixture is kneaded with an auxiliary material containing common salt, an alkaline brine solution and the like and water by a mixer, and thus dough for noodles can be produced.

<Slitting Step>

The slitting step has such a structure in which dough for noodles is rolled by roll-rolling and a thinned dough sheet is continuously slit by a cutting blade device, and then air flow of the present invention is blown to the obtained noodle strips. More specifically, it may be preferred that an air flow supply means 6 is arranged between an upper noodle strip bundle 2a and a lower noodle strip bundle 2b at the time of peeling off by scrapers (4a and 4b of FIG. 1). A hole, through which air flow is discharged, is formed on a hollow tubular member constituting an air flow supply means 6, and the hollow tubular member for supplying the air flow may preferably be connected to a supply source of the air flow, for example, an air flow compressor, an air flow blower and the like. Taking a pressure or the like of air flow to be blown, a high-pressure air flow compressor may preferably be used.

A discharge port of air flow may be formed at the position which enables blowing air flow with directionality to upper and lower noodle strip bundles, and air flow may be blown vertically or obliquely to the noodle strip bundle. However, it is necessary to pay attention to the fact that the noodle strip may be sometimes caught on the air flow supply means 6 when air flow is blown in the direction opposite to a running direction of the noodle strip bundle.

(Discharge Port of Air Flow)

In order to supply air flow with directionality, it may be preferred that there is some gap (hereinafter, pitch) between a discharge port of air flow and adjacent discharge port of air flow. More specifically, when the pitch is adjusted within a range from about 2 mm to 20 mm, the position where air flow is blown off and the position where air flow is not blown off are created. Therefore, it is possible to largely change an orbit between a noodle strip to which air flow is blown and a noodle strip to which air flow is not blown. Depending on the width of the noodle strip, when the pitch is more than 20 mm, the area to which air flow is not blown increases and thus the position where the orbit of the noodle strip cannot be changed may increase. In contrast, when the pitch is 2 mm or less, it becomes difficult to create directionality of air flow, and thus it may become slightly difficult to change the orbit of each noodle strip. Usually, the pitch may preferably be from about 2 mm to 20 mm, and more preferably from 5 mm to 15 mm. Particularly preferably, the pitch between a discharge port of air flow and an adjacent discharge port of air flow may preferably be from 5 mm to 10 mm.

The shape of a hole of a discharge port of air flow may be optionally selected from ring, square, triangle, slit shape and the like. It is possible to supply air flow with directionality by forming a hole, for example, a round hole of about $\phi 0.2$ mm to $\phi 3$ mm in diameter. When the diameter is more than $\phi 3$ mm, it may become difficult to ensure an opening ratio of the total numbers of discharge ports relative to the size of a hollow tubular member. In contrast, when the diameter is $\phi 0.2$ mm or less, it may become difficult to process a discharge port. Usually, the diameter of a hole formed is within a range from about $\phi 0.2$ mm to $\phi 3$ mm, and more preferably from about $\phi 0.5$ mm to $\phi 1.5$ mm.

(Air Flow Pressure)

The air flow pressure can be appropriately controlled according to the state of the obtained noodle strips. When the air flow is too strong, a noodle strip is excessively flied and thus a problem such as falling off from a wave conveyer may occur. For example, the pressure used to blow air flow may preferably be from about 0.02 MPa to 0.3 MPa, and more preferably from about 0.05 MPa to 0.2 MPa, since the noodle strip can be appropriately "allowed to act vigorously" and it is more preferred form the viewpoint of exertion of the effects of the present invention.

The pressure of this air flow is the value measured by decompression adjustment using a precision regulator (manufacturer: SMC Corporation, Model Number: 1R3010-03BG) mounted to the position which is located 1 m before an air piping.

Furthermore, it may be preferred that the discharge port in the above-mentioned state is formed on the air flow supply means 6 so as to facilitate a change in an orbit of individual noodle strip. For example, when the air flow supply means 6 is made of a hollow cylindrical member (hollow round bar) and round holes are formed in the form a linear staggered type (type shown in FIG. 5), a discharge angle and a discharge position become irregular, and thus it is more effective as compared with an embodiment in which linear holes are simply formed.

As mentioned above, it may be preferred that air flow is blown to upper and lower noodle strip bundles, respectively. It is possible for the upper noodle strip bundle to draw a random orbit only by supplying air flow only to the upper noodle strip bundle 2a, and thus the lower noodle strip bundle 2b becomes a synchronized noodle strip. The respective upper and lower noodle strip bundles are surely separated by arranging the air flow supply means 6 between the upper and lower noodle strip bundles. Therefore, the respective upper and lower noodle strip bundles are surely separated without being intersected with each other. Accordingly, unfastening property becomes noticeably satisfactory as compared with the case of using no air flow, as a matter of course. In contrast, the same effects can also be obtained by supplying air flow only to the lower noodle strip without supplying air flow to the upper noodle strip. However, in this case, it is necessary to pay attention to the fact that the noodle strip may be sometimes caught on the air flow supply means 6 when air flow is not supplied to upper noodle strip.

(Pre-Gelatinization Treatment Step)

The pre-gelatinization treatment step in the present invention can be appropriately carried out by a boiling treatment using boiled hot water, or a steaming cooking treatment using steam may be used. More preferably, a steamer using steam may be preferably used.

<Stretching Step>

It is possible to carry out cutting in a constant weight of one meal by stretching steamed noodles. In this stretching step, it may be preferred that steamed noodles are stretched in a state where an aqueous solution is applied and cut in an amount of one meal thereof. It is possible to peel off slightly stuck noodle strips by applying an aqueous solution on a surface of noodle strips. The aqueous solution may be applied by spray nozzle, shower, immersion and the like. Furthermore, it is also effective to use an unfastening device disclosed in Japanese Patent Application No. 2010-537611 for noodle strips cut in an amount of one meal thereof. It may be preferred that slightly stuck noodle strips can be further unfastened forcibly.

<Drying Step>

The noodle strips obtained by the above-mentioned technique are introduced into a drying basket so that the noodle strips are shaped and the drying basket is filled with the noodle strips in an amount of one meal thereof and a drying step is performed, and thus instant dried noodles of the present invention can be obtained. In a drying method, it is possible to optionally use an oil-fry drying method which is a method of frying in oil, a hot-air drying method using hot air, and the like. In the oil-fry drying method, drying may be performed, to thereby adjust the final moisture within a range from 2 to 3%. In the hot-air drying method, drying may be performed, to thereby adjust the final moisture within a range from 6 to 14%. Regarding the drying conditions such as a drying temperature, a conventional method may be directly applied.

(Evaluation of "Sticking Degree" of Noodle Strips)

In the present invention, "sticking degree" of a noodle strip can preferably be evaluated under the conditions used in the below-mentioned "test example" (about 100 noodle strips are used). That is, evaluation was performed under the conditions used in the "test example" (about 100 noodle strips are used). With respect to these noodle strips, "sticking degree" (percentage) can be calculated in accordance with the following calculation formula.

(Sticking degree)=100×(the number of stuck noodle strips)/(the total number of tested noodle strips)

In noodle strips obtained by the method of the present invention, "sticking degree" (average of results of a test performed three times) obtained in each test may preferably be 35% or less. The "sticking degree" may more preferably be 25% or less, and still more preferably 20% or less (especially, 15% or less).

The present invention will be described in more detail by way of Examples.

EXAMPLES

Test Example 1

The effect of use of air flow was confirmed by the following tests.

<Production of Noodle Strips>

Formulation: 10 kg of wheat flour (DNS, protein content 10.5%), 100 g of common salt, 20 g of alkaline brine solution (sodium carbonate), and 3,400 ml of water.

A cutting blade device with the constitution shown in FIG. 1 was used. In this device, the size of each element was as follows.

Cutting blade rolls (made of iron) 1a and 1b: 37 mm in diameter, width in 210 mm Shoot 3 (made of stainless steel): 1.5 mm in thickness Scrapers 4a and 4b (made of brass): 1 mm in thickness <Conditions for Formation of Noodle Strips>

Conditions of noodle strips: cutting blade; No. 24 round shape, cutting blade roll; rotational speed of 205 rpm, noodle strips having a noodle thickness of 1.5 mm, conduit with no cover, scraping width; 35 mm Diameter of air flow supply means 6: φ10 mm Air flow discharge port arranged: 1 mm hole, pitch of 10 mm, 15 degree staggered type (refer to FIGS. 4(a) and 4(b))

Air flow was supplied to noodle strips under pressure of 0.1 MPa (Megapascal).

After setting a speed of a wave conveyer at 4.4 m/min, a random generally linear noodle strip bundle was obtained, steam-cooked at 0.5 kg/cm$^2$ for 2 minutes and then cut into a noodle weight of 100 g, to thereby obtain steamed noodles.

Figure 8:
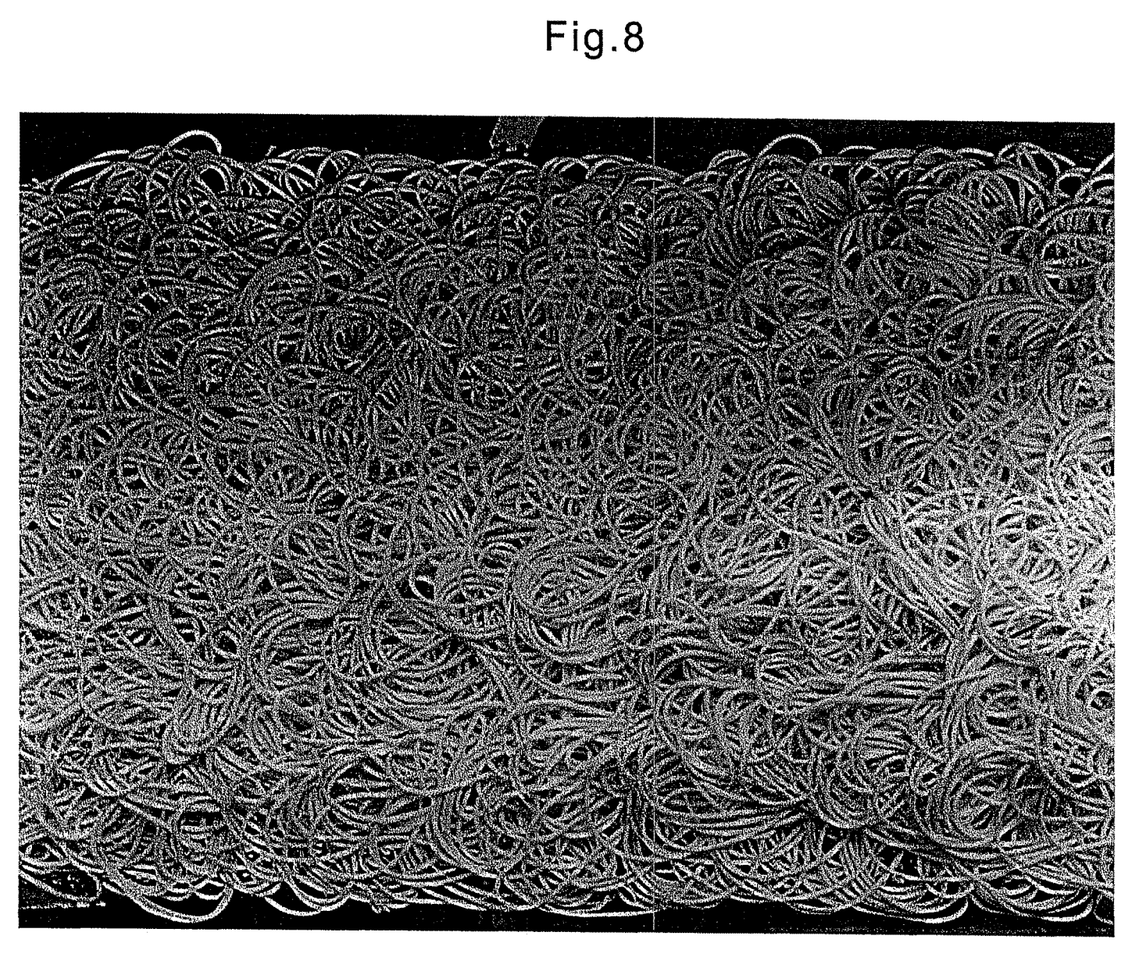
FIG. 8 is a photograph showing an example in a state where slit noodle strips of a test example (with air) form a noodle strip bundle on a wave conveyer.

The steamed noodle obtained above was immersed in fresh water for 10 seconds and lumps of immersed noodle strips were forcibly unfastened once (for about 1 second) at 1,200 rpm, using an unfastening device disclosed in FIG. 8(a) of Japanese Patent Application No. 2010-537611. The number of "stuck noodle strips" of lumps of noodle strips after unfastening was counted using the unfastening device.

A method of counting the number of stuck noodle strips is as follows. With respect to lumps of noodle strips after unfastening using the unfastening device, one noodle strip was taken out by hands. Classification was made into those which can be taken out as one noodle strip and those which cannot be taken out as one noodle strip. When two or more noodle strips were taken out in a state of being stuck to each other, the picked noodle strips (distance of 30 cm) were swung three times at a speed of 0.7 seconds. With respect to slight sticking, when noodle strips were unfastened by swinging, it was judged that "noodle strips are unfastened". In contrast, when noodle strips were not unfastened or firmly stuck even in case of swinging in such a manner, it was judged that "noodle strips are stuck". At this time, when two noodle strips are stuck, the number was counted "2". When five noodle strips are stuck, the number was counted "5".

For comparison, a cover of a conduit was lifted, to thereby obtain generally linear noodle strips using a conventional cutting blade device of FIG. 2. The subsequent treatment was common to the above test example.

The results are shown in Table 1. Photographs of a noodle strip bundle on a wave conveyer (with or without air flow) are shown in FIG. 8 (case with air flow) and FIG. 9 (case without air flow). The reason why the respective lumps of noodle strips differ in the "total number of noodles" is because they delicately differ in the number of the respective lumps of noodle strips since lumps of noodle strips were divided by the weight.

TABLE 1

|  | Number of non-stuck noodle strips | Number of stuck noodle strips |
|---|---|---|
| With air | 98 | 8 |
| With air | 106 | 13 |
| With air | 95 | 10 |
| Without air | 57 | 69 |
| Without air | 62 | 60 |
| Without air | 55 | 68 |

From the above test results, the following average (each test was performed three times) can be calculated. The calculation results are shown in Table 2 below.
(Effect of Air Flow)

TABLE 2

| Effect of use of air | | | |
|---|---|---|---|
|  | No sticking recognized | Sticking recognized | Total | Degree of sticking |
| With air | 98 | 8 | 106 | 7.5 |
| With air | 106 | 13 | 119 | 10.9 |
| With air | 95 | 10 | 105 | 9.5 |
| Total | 299 | 31 | 330 | 9.4 |
| Without air | 57 | 69 | 126 | 54.8 |
| Without air | 62 | 60 | 122 | 49.2 |
| Without air | 55 | 68 | 123 | 55.3 |
| Total | 174 | 197 | 371 | 53.1 |

From the above-mentioned results, it will be understood that use of air flow enables suppression of sticking of noodle strips at the time of steam cooking even if strong waves are not imparted. This is because use of air flow of the present invention enables reduction in the points of contact between noodle strips even if strong longitudinal waves are not imparted. When generally linear noodle strips are obtained using the method in which air flow is not used, i.e., a conventional cutting blade device, since each of the noodle strips perform the similar movement, it is impossible to reduce the points of contact between noodle strips, leading to a lot of strong sticking between noodle strips. Noodle strips stuck to each other by such steam cooking are in a state of being stuck even after the drying step. Therefore, since noodle strips are strongly stuck to each other, noodle strips are not unfastened at the time of eating, resulting in poor restoration.

The present invention will be described in more detail below by way of examples.

Example 1

Wheat flour (950 g, ASW, protein content 9.5%) and potato starch powder (50 g), as a powder raw material, were kneaded with kneading water, which had been prepared by dissolving 3 g of sodium carbonate and 10 g of common salt in 350 ml of water, and then rolled, to thereby obtain noodle strips each having a cutting blade No. 20 (circular) and a noodle thickness of 1.30 mm. A cutting blade roll (diameter of 37 mm, rotational speed of 200 rpm, scraping width of 35 mm) and air flow supply means 6 ($\phi$10 mm, 1 mm hole, pitch of 10 mm, 15 degree staggered type, refer to FIG. 4($a$)) were arranged and air flow was supplied to noodle strips under a pressure of 0.1 MPa (regarding a form of a cutting blade device, refer to FIG. 1). After obtaining a random noodle strip bundle by setting a speed of a wave conveyer at 4.5 m/min, the noodle strip bundle was continuously subjected to steam cooking and then 30 ml of fresh water was showered per one meal of noodle strips (100 g of steamed noodles). The noodle strips cut into showered noodle weight of 115 g was introduced into a basket and fried at a frying temperature of 150° C. for 2 minutes using an oil-fry drying method, to thereby obtain instant fried noodles having a final moisture content of 2%.

Example 2

Wheat flour (900 g, ASW, protein content 9.5%) and potato starch powder (100 g), as a powder raw material, were kneaded with kneading water, which had been prepared by dissolving 3 g of sodium carbonate and 10 g of common salt in 330 ml of water, and then rolled, to thereby obtain noodle strips each having a cutting blade No. 20 (circular) and a noodle thickness of 1.30 mm. A cutting blade roll (diameter of 37 mm, rotational speed of 200 rpm, scraping width of 35 mm) and air flow supply means 6 ($\phi$10 mm, 1 mm hole, pitch of 10 mm, linear type, refer to FIGS. 5($a$) and 5($b$)) were arranged and air flow was supplied to noodle strips under a pressure of 0.1 MPa. After obtaining a random noodle strip bundle by setting a speed of a wave conveyer at 4.5 m/min, the noodle strip bundle was continuously subjected to steam cooking and then 30 ml of fresh water was showered per one meal of noodle strips (100 g of steamed noodles). The noodle strips cut into showered noodle weight of 115 g was introduced into a basket and fried at a frying temperature of 150° C. for 2 minutes using an oil-fry drying method, to thereby obtain instant fried noodles having a final moisture content of 2%.

Example 3

Wheat flour (950 g, ASW, protein content 9.5%) and tapioca starch powder (50 g), as a powder raw material, were kneaded with kneading water, which had been prepared by dissolving 5 g of sodium carbonate and 10 g of common salt in 350 ml of water, and then rolled, to thereby obtain noodle strips each having a cutting blade No. 16 (circular) and a noodle thickness of 1.20 mm. A cutting blade roll (diameter of 37 mm, rotational speed of 200 rpm, scraping width of 35 mm) and air flow supply means 6 ($\phi$10 mm, 1 mm hole, pitch of 10 mm, 15 degree staggered type, refer to FIG. 6, type 1) were arranged and air flow was supplied to noodle strips under a pressure of 0.15 MPa. After obtaining a random noodle strip bundle by setting a speed of a wave conveyer at 4.5 m/min, the noodle strip bundle was continuously subjected to steam cooking and then 20 ml of an unfastening liquid (1.0% aqueous solution of "SOYAFIVE S" manufactured by Fuji Oil Co., Ltd.) was sprayed over the steamed noodles cut into 100 g of a noodle weight per one meal of noodle strips. Then, a $\phi$120 mm drying frame mold was air-flow filled with the noodle strips. Then, the noodle strips were dried in a drier for 40 minutes which had been set at a temperature of 80° C. and a wind velocity of 4 m/s, to thereby obtain instant hot-air dried noodles having a final moisture content of 10%.

Comparative Example 1

The conditions used in this Comparative Example 1 were the same as those used in Example 1, except that the air flow supply means 6 of the cutting blade device used in Example 1 was removed, similar instant hot-air dried noodles were obtained.

Comparative Example 2

The conditions used in this Comparative Example 2 were the same as those used in Example 2, except that the air flow supply means 6 of the cutting blade device used in Example 2 was removed, similar instant hot-air dried noodles were obtained.

Comparative Example 3

The conditions used in this Comparative Example 3 were the same as those used in Example 3, except that the air flow supply means 6 of the cutting blade device used in Example 3 was removed, similar instant hot-air dried noodles were obtained.

With respect to the instant dried noodles obtained in Examples 1 to 3 and Comparative Examples 1 to 3, the following evaluation was performed. The obtained results are shown in Table 3 below.

TABLE 3

| | Degree of randomness of slit noodle strips | Degree of synchronization of slit noodle strips | Unfastening property of steamed noodles | Unfastening property of noodles at the time of eating |
| --- | --- | --- | --- | --- |
| Example 1 | 5 (Irregular) | 5 (Synchronization is scarcely recognized) | 5 | 5 |
| Example 2 | 5 (Irregular) | 5 (Synchronization is scarcely recognized) | 5 | 5 |
| Example 3 | 5 (Irregular) | 5 (Synchronization is scarcely recognized) | 5 | 5 |
| Comparative Example 1 | 1 (Regular) | 1 (Synchronization is recognized) | 1 | 1 |
| Comparative Example 2 | 1 (Regular) | 1 (Synchronization is recognized) | 1 | 1 |
| Comparative Example 3 | 1 (Regular) | 1 (Synchronization is recognized) | 1 | 1 |

Furthermore, a state where slit noodle strips obtained in Example 1 form a noodle strip bundle on a wave conveyer was the same as in FIG. 8. In addition, a state where slit noodle strips obtained in Comparative Example 1 form a noodle strip bundle on a wave conveyer was the same as in FIG. 9.

Figure 9:
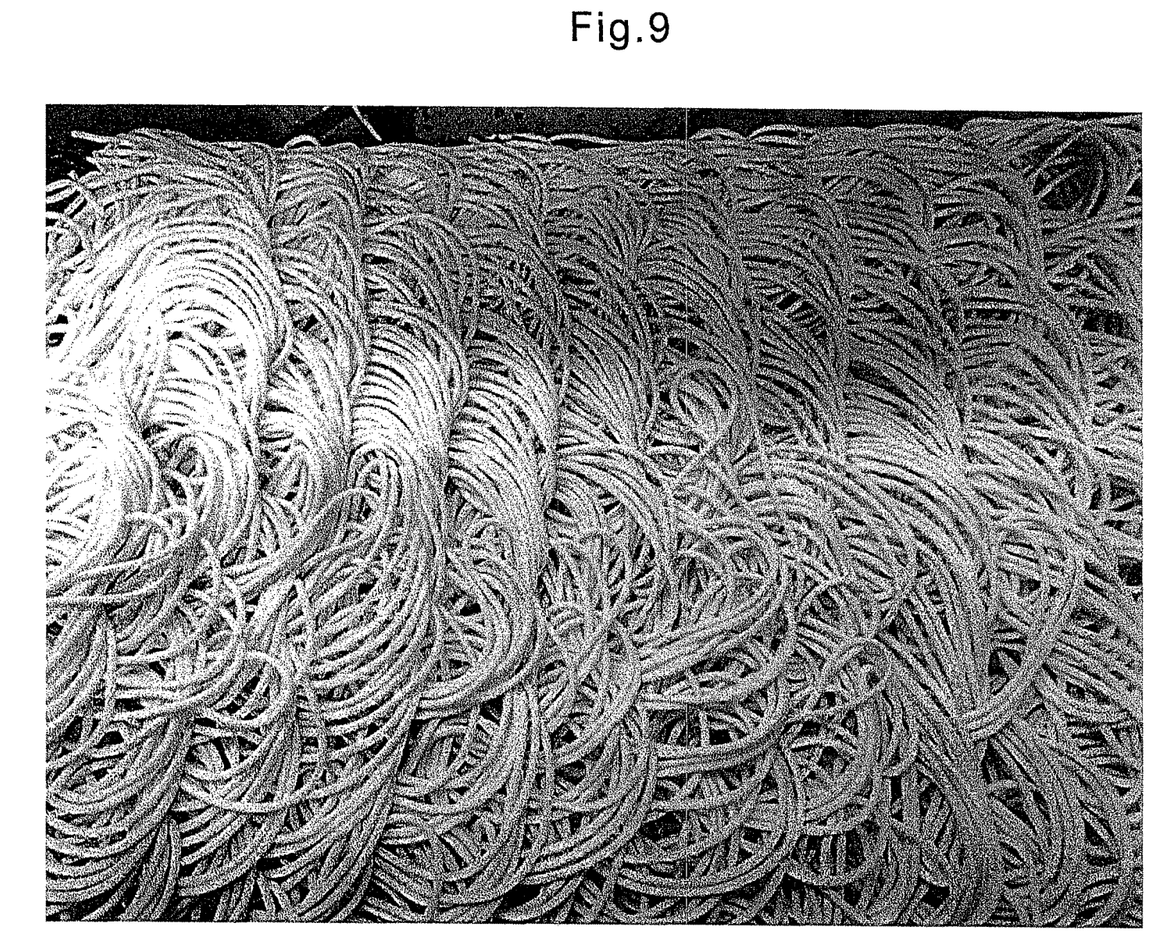
FIG. 9 is a photograph showing an example in a state where slit noodle strips of a test example (without air) form a noodle strip bundle on a wave conveyer.

As is apparent from Table 3 as well as FIGS. 8 and 9, each of the noodle strips obtained by the present invention perform unpredictable random movement. That is, they do not draw a ring continuously, but perform random movement in an opposite, lateral or forward direction to a running direction. From a comparison between Example 3 and Comparative Example 3, it will be understood that the effects are substantially maintained even in hot-air dried noodles and the like.

As is apparent from the above results, the effects of the present invention can impart random movement to noodle strips by directly supply air flow to noodle strips, and can reduce the points of contact between noodle strips without imparting strong longitudinal waves. Therefore, in the present invention, it is possible to suppress sticking of noodle strips at the time of steam cooking even without imparting strong longitudinal waves. Since it is possible to vaporize moisture on a surface of noodle strips at the time of slitting by supplying air flow, noodle strips with more satisfactory unfastening property can be obtained.

EXPLANATION OF REFERENCE NUMERALS

1 Cutting blade device
2a, 2b Slit noodle strip
3 Shoot
4a, 4b Scraping member
5 Dough sheet
6 Air flow supply means

The invention claimed is:

1. A process for producing noodle strips in which a dough sheet is slit into noodle strips using a rotary slitting device comprising at least a pair of cutting blade rolls, scraping members and air flow supply, the process comprising the steps of:
passing the dough sheet through the cutting blade roll, thereby slitting the dough sheet into noodle strips;
peeling the noodle strips off from the cutting blade rolls using the scraping members, thereby separating peeled noodle strips into upper peeled noodle strips and lower peeled noodle strips; and
supplying air flow from the air flow supply to the upper peeled noodle strips and the lower peeled noodle strips while the upper and lower peeled noodle strips are in an air space, thereby changing an orbit of each noodle strip in an air space and forming noodle strip bundles on a wave conveyer, wherein each noodle strip that forms the noodle strip bundles has an annular, transverse wave-shaped and/or zigzag-shaped orbit;
wherein the air flow supply is arranged at a portion between the upper peeled noodle strips and the lower peeled noodle strips;
wherein the air flow is supplied between, and directly to each of, the upper peeled noodle strips and the lower peeled noodle strips; and
wherein the air flow supply is provided with a plurality of air flow discharge ports, and the air flow discharge ports have a polygonal slit, circular or oval shape.

2. The process for producing noodle strips according to claim 1, wherein the air flow pushes the noodle strips away from the cutting blade rolls toward a longitudinal direction of the noodle strips or in a direction oblique to the noodle strips.

3. The process for producing noodle strips according to claim 1, wherein the air flow, which is supplied to the noodle strips from the air flow supply, is flow with directionality.

4. The process for producing noodle strips according to claim 1, wherein the air flow supply includes a hollow columnar member or hollow prismatic tubular member.

5. A process for producing instant dried noodles in which a dough sheet is slit into noodle strips using a rotary slitting device comprising at least a pair of cutting blade rolls, scraping members and air flow supply, the process comprising the steps of:
passing the dough sheet through the cutting blade rolls, thereby slitting the dough sheet into noodle strips;

peeling the noodle strips off from the cutting blade rolls using the scraping member, thereby separating peeled noodle strips into upper peeled noodle strips and lower peeled noodle strips;

supplying air flow from the air flow supply to the upper peeled noodle strips and the lower peeled noodle strips while the upper and lower peeled noodle strips are in an air space, thereby changing an orbit of each noodle strip in an air space and forming a generally flat noodle strip bundle on a wave conveyer without substantially forming longitudinal waves in the noodle strips, and wherein each noodle strip that forms the noodle strip bundles has an annular, transverse wave-shaped and/or zigzag-shaped orbit; and gelatinizing the generally flat noodle strip bundle, followed by drying;

wherein the air flow supply is arranged at a portion between the upper peeled noodle strips and the lower peeled noodle strips;

wherein the air flow is supplied between, and directly to each of, the upper peeled noodle strips and the lower peeled noodle strips; and wherein the air flow supply is provided with a plurality of air flow discharge ports, and the air flow discharge ports have a polygonal slit, circular or oval shape.

6. The process for producing instant dried noodles according to claim 5, wherein the generally flat noodle strip bundle is formed by gathering the noodle strips moved randomly.

7. The process for producing instant dried noodles according to claim 6, wherein the noodle strips of the generally flat noodle strip bundle have an annular, transverse wave-shaped and/or zigzag-shaped orbit.

8. The process for producing instant dried noodles according to claim 5, wherein a steamer using steam is used in the gelatinizing step.

* * * * *